(12) United States Patent
Yeredor et al.

(10) Patent No.: US 9,052,386 B2
(45) Date of Patent: Jun. 9, 2015

(54) METHOD AND APPARATUS FOR VIDEO FRAME SEQUENCE-BASED OBJECT TRACKING

(75) Inventors: Arie Yeredor, Ra'anana (IL); Igal Dvir, Ra'anana (IL); Guy Koren-Blumstein, Kfar Saba (IL); Boaz Lachover, Tel Aviv (IL)

(73) Assignee: NICE SYSTEMS, LTD, Ra'anana (IL)

( * ) Notice: Subject to any disclaimer, the term of this patent is extended or adjusted under 35 U.S.C. 154(b) by 1941 days.

(21) Appl. No.: 12/220,354

(22) Filed: Jul. 24, 2008

(65) Prior Publication Data
US 2009/0033745 A1  Feb. 5, 2009

Related U.S. Application Data

(62) Division of application No. 10/480,365, filed as application No. PCT/IL03/00097 on Feb. 6, 2003, now Pat. No. 7,436,887.

(60) Provisional application No. 60/354,209, filed on Feb. 6, 2002.

(51) Int. Cl.
| | | |
|---|---|---|
| H04N 7/12 | (2006.01) |
| H04N 11/02 | (2006.01) |
| H04N 11/04 | (2006.01) |
| G01S 3/786 | (2006.01) |
| G06K 9/00 | (2006.01) |
| G06T 7/20 | (2006.01) |
| G08B 13/196 | (2006.01) |
| H04N 5/76 | (2006.01) |
| G07C 9/00 | (2006.01) |
| H04N 5/77 | (2006.01) |
| H04N 5/781 | (2006.01) |
| H04N 5/85 | (2006.01) |

(52) U.S. Cl.
CPC .......... *G01S 3/7864* (2013.01); *G06K 9/00771* (2013.01); *G06T 7/2053* (2013.01); *G07C 9/00* (2013.01); *G08B 13/19602* (2013.01); *G08B 13/19604* (2013.01); *G08B 13/19608* (2013.01); *G08B 13/19615* (2013.01); *G08B 13/1968* (2013.01); *G08B 13/19682* (2013.01); *H04N 5/76* (2013.01); *H04N 5/77* (2013.01); *H04N 5/781* (2013.01); *H04N 5/85* (2013.01)

(58) Field of Classification Search
CPC .... G06K 9/00771; G06T 7/2053; H04N 5/76; H04N 5/77; H04N 5/781; H04N 5/85
See application file for complete search history.

(56) References Cited

U.S. PATENT DOCUMENTS

| | | | | |
|---|---|---|---|---|
| 4,737,847 A * | 4/1988 | Araki et al. | ................... | 348/161 |
| 6,570,608 B1 * | 5/2003 | Tserng | ........................ | 348/143 |
| 6,628,835 B1 * | 9/2003 | Brill et al. | ..................... | 382/226 |
| 6,724,915 B1 * | 4/2004 | Toklu et al. | ................... | 382/103 |
| 2003/0142209 A1 * | 7/2003 | Yamazaki et al. | ............ | 348/143 |

* cited by examiner

*Primary Examiner* — Nhon Diep
(74) *Attorney, Agent, or Firm* — Soroker-Agmon

(57) ABSTRACT

An apparatus and method for the analysis of a sequence of captured images covering a scene for detecting and tracking of moving and static objects (86) and for matching (88) the patterns of object behavior in the captured images to object behavior in predetermined scenarios.

26 Claims, 12 Drawing Sheets

METHOD AND APPARATUS FOR VIDEO FRAME SEQUENCE-BASED OBJECT TRACKING

RELATED APPLICATIONS

The present application is a divisional continuation application of application Ser. No. 10/480,365 filed 10 Dec. 2003, now U.S. Pat. No. 7,436,887, which is a national phase of PCT application No. PCT/IL03/00097 filed Feb. 6, 2003, which claims priority from provisional application No. 60/354,209 filed Feb. 6, 2002.

BACKGROUND OF THE INVENTION

1. Field of the Invention

The present invention relates to video surveillance systems in general, and more particularly to video frame sequence-based objects tracking in video surveillance environments.

2. Discussion of the Related Art

Existing video surveillance systems are based on diverse automatic object tracking methods. Object tracking methods are designed to process a captured sequence of temporally consecutive images in order to detect and track objects that do not belong to the "natural" scene being monitored. Current object tracking methods are typically performed by the separation of the objects from the background (by delineating or segmenting the objects), and via the determination of the motion vectors of the objects across the sequence of frames in accordance with the spatial transformations of the tracked objects. The drawbacks of the current methods concern the inability to track static objects for a lengthy period of time. Thus, following a short interval, during which a previously dynamic object ceased moving, the tracking of the same object is effectively rendered. An additional drawback of the current methods concerns the inability of the methods to handle "occlusion" situations, such as where the tracked objects are occluded (partially or entirely) by other objects temporarily passing through or permanently located between the image acquiring devices and the tracked object.

There is a need for an advanced and enhanced surveillance, object tracking and identification system. Such a system would preferably automate the procedure concerning the identification of an unattended object. Such a system would further utilize an advanced object tracking method that would provide the option of tracking a non-moving object for an operationally effective period and would continue tracking objects in an efficient manner even where the tracked object is occluded.

SUMMARY OF THE PRESENT INVENTION

One aspect of the present invention regards an apparatus for the analysis of a sequence of captured images covering a scene for detecting and tracking of moving and static objects and for matching the patterns of object behavior in the captured images to object behavior in predetermined scenarios. The apparatus comprises at least one image sequence source for transmitting a sequence of images to an object tracking program, and an object tracking program. The object tracking program comprises a pre-processing application layer for constructing a difference image between a currently captured video frame and a previously constructed reference image, an objects clustering application layer for generating at least one new or updated object from the difference image and an at least one existing object, and a background updating application layer for updating at least one reference image prior to processing of a new frame.

A second aspect of the present invention regards a method for the analysis of a sequence of captured images showing a scene for detecting and tracking of at least one moving or static object and for matching the patterns of the at least one object behavior in the captured images to object behavior in predetermined scenarios. The method comprises capturing at least one image of the scene, pre-processing the captured at least one image and generating a short term difference image and a long term difference image, clustering the at least one moving or static object in the short term difference and long term difference images, and generating at least one new object and at least one existing object.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
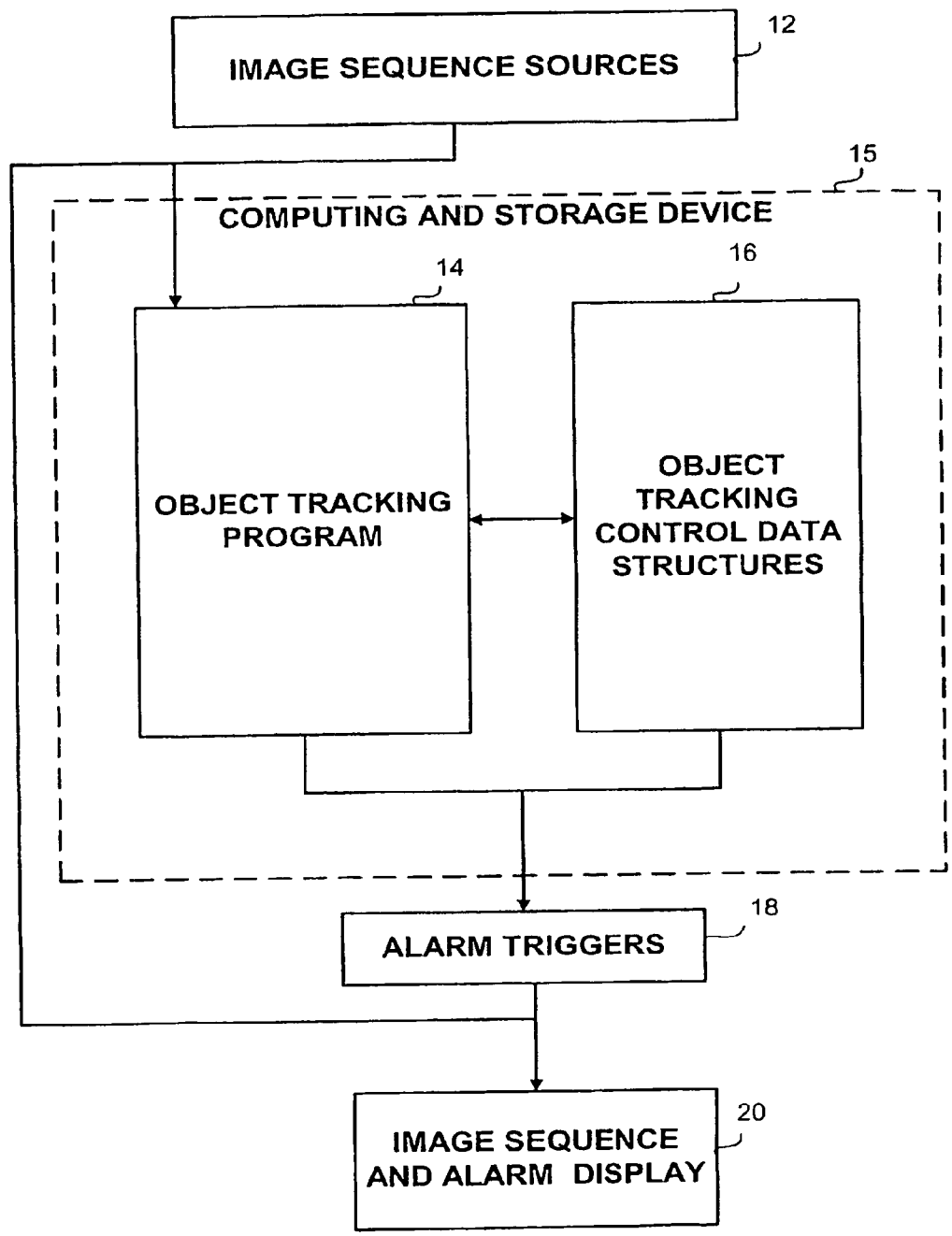
FIG. 1 is a schematic block diagram of the system architecture, in accordance with a preferred embodiment of the present invention.

An object tracking apparatus and method for the detection and tracking of dynamic and static objects is disclosed. The apparatus and method may be utilized in a monitoring and surveillance system. The surveillance system is operative in the detection of potential alarm situation via a recorded surveillance content analysis and in the management of the detected unattended object situation via an alarm distribution mechanism. The object tracking apparatus supports the object tracking method that incorporates a unique method for detecting, tracking and counting objects across a sequence of captured surveillance content images. Through the operation of the object tracking method the captured content is analyzed and the results of the analysis provide the option of activating in real time a set of alarm messages to a set of diverse devices via a triggering mechanism. In order to provide the context in which the object tracking apparatus method is useful, several exemplary associated applications will be briefly described. The method of the present invention may be implemented in various contexts such as the detection of unattended objects (luggage, vehicles or persons), identification of vehicles parking or driving in restricted zones, access control of persons into restricted zones, prevention of loss of objects (luggage or persons) and counting of persons, as well as in police and fire alarm situations. In likewise manner the object tracking apparatus and method described here in may be useful in myriad of other situations and as a video objects analysis tool.

In the preferred embodiments of the present invention, the monitored content is a stream of video images recorded by video cameras, captured, and sampled by a video capture device and transferred to a video processing unit. Each part of this system may be located in a single device or in separate devices located in various locations and inter-connected by hardwire or via wireless connection over local or wide or other networks. The video processing unit performs a content analysis of the video frames where the content analysis is based on the object tracking method. The results of the analysis could indicate an alarm situation. In other preferred embodiments of the invention, diverse other content formats are also analyzed, such as thermal based sensor cameras, audio, wireless linked cameras, data produced from motion detectors, and the like.

An exemplary application that could utilize the apparatus and method of the present invention concerns the detection of unattended objects, such as luggage in a dynamic object-rich environment, such as an airport or city center. Other exemplary applications concern the detection of a vehicle parked in a forbidden zone, or the extended-period presence of a non-moving vehicle in a restricted-period parking zone. Forbidden or restricted parking zones are typically associated with sensitive traffic-intensive locations, such as a city center. Still applications that could use the apparatus and method include the tracking of objects such as persons involved in various scenario models, such as a person leaving the vehicle away from the terminal, which may equal suspicious (unpredicted) behavioral pattern. In other possible applications of the apparatus and method of the present invention can be implemented to assist in locating lost luggage and to restrict access of persons or vehicles to certain zones. Yet other applications could regard the detection of diverse other objects in diverse other environments. The following description is not meant to be limiting and the scope of the invention is defined only by the attached claims. Several such applications are described in detail in related PCT patent application serial number PCT/IL02/01042 titled SYSTEM AND METHOD FOR VIDEO CONTENT-ANALYSIS-BASED DETECTION, SURVEILLANCE, AND ALARM MANAGEMENT, filed 24 Dec. 2002, the content of which is incorporated herein by reference.

The method and apparatus of the present invention is operative in the analysis of a sequence of video images received from a video camera covering a predefined area, referred herein below to as the video scene. In one example it may be assumed that the object monitored is a combined object comprising an individual and a suitcase where the individual carries the suitcase. The combined object may be separated into a first separate object and a second separate object. It is assumed that the individual (second object) leaves the suitcase (first object) on the floor, a bench, or the like. The first object remains in the video scene without movement for a pre-defined period of time. It is assumed that the suitcase (first object) was left unattended. The second object exits the video scene. It is assumed that the individual (second object) left the video scene without the suitcase (first object) and is now about leave the wider area around the video scene. Following the identification of the previous sub-events, referred to collectively as the video scene characteristics, the event will be identified by the system as a situation in which an unattended suitcase was left in the security-sensitive area. Thus, the unattended suitcase will be considered as a suspicious object. Consequently, the system of the present invention generates, displays, and or distributes an alarm indication. Likewise, in an alternative embodiment a first object, such as a suitcase or person monitored is already present and monitored within the video scene. Such object can be lost luggage located within the airport. Such object can be a person monitored. The object may merge into a second object. The second object can be a person picking up the luggage, another person to whom the first person joins or a vehicle to which the first person enters. The first object (now merged with the second object) may move from its original position and exist the scene or move in a prohibited direction so predetermined. The application will provide an indication to a human operator. The indication may be oral, visual or written. The indication may be provided visually to a screen or delivered via communication networks to officers located at the scene or to off-premises or via dry contact to an external device such as a siren, a bell, a flashing or revolving light and the like. An additional exemplary application that could utilize the apparatus and method of the present invention regards a detection of vehicles parked in restricted area or moving in restricted lanes. Airports, government buildings, hotels and other institutions typically forbid vehicles from parking in specific areas or driving in restricted lanes. In some areas parking is forbidden all the time while in other areas parking is allowed for a short period, such as several minutes. The second exemplary application is designed to detect vehicles parking in restricted areas for more than a pre-defined number of time units and generates an alarm when identifying an illegal parking event of a specific vehicle. In another preferred embodiment the system and method of the present invention can detect whether persons disembark or embark a vehicle in predefined restricted zones. Other exemplary applications can include the monitoring of persons and objects in city centers, warehouses, restricted areas, borders or checkpoints and the like.

It would be easily perceived that for the successful operation of the above-described applications an object tracking apparatus and an object tracking method are required. The object tracking method should be capable of detecting moving objects, tracking moving objects and tracking static objects, such as objects that are identified as moving and subsequently identified as non-moving during a lengthy period of time. In order to match the patterns of object behavior in the captured image sequences to the patterns of object behavior in above-described scenarios, the object tracking method should recognize linked or physically connected objects, to be able to recognize the separation of the linked objects, to track the separated objects while retaining the historical connectivity states of the objects. The object tracking apparatus and method should further be able to handle occlusions where the tracked objects are occluded by one or more separate objects temporarily, semi-permanently or permanently.

Referring to FIG. 1 the image sequence sources 12 are one or more video cameras operating in a security-wise sensitive environment and cover a specific pre-defined visual area that is required to be monitored. The area monitored can be any area preferably in a transportation area including an airport, a city center, a building, and restricted or non-restricted areas within buildings or outdoors. The image sequence sources 12 could include analog devices and/or digital devices. The images provided by the image sequence sources could include normal light, infrared, temperature, or any other form of radiation. The image sequence sources 12 continuously acquire and transmit sequences of video images and provide the images simultaneously to an image sequence display device 20 and to a computing and storage device 15. The display device 20 could be a video terminal, which is operated by a human operator or any other display device including a display device located on a mobile or hand held device. Alarm triggers are generated by the object tracking program 14 installed in the computing and storage device 15 in order to indicate an alarm situation to the operator of the display device 20. The alarm may be generated in the form of an audio or any other indication. The image sequence sources 12 transmit sequences of video images to an object tracking program 14 via suitably wired connections. The images could be provided through an analog interface, a digital interface or through a Local Area Network (LAN) interface or Wide Area Network (WAN), IP, Wireless, Satellite connectivity. The computing and storage device 15 could be an external computing platform, such as a personal computer (PC), a UNIX workstation or a mainframe computer having appropriate processing and storage units or a dedicated hardware such as a DSP based platform. It is contemplated that future hand held devices will be powerful enough to also implement device 15 there within. The device 15 could be also an array of integrated circuits with built-in digital signal processing (DSP) and storage capabilities coupled directly to the image sequence sources 12. The device 15 includes a set of object tracking routines constituting the object tracking program 14 and a set of object tracking control data structures 16. The object tracking program 14 in association with the object tracking control data structures 16 receives the image sequence from the image sequence sources 12, and processes the image sequence in order to detect and to track objects therein. Consequent to the detection of pre-defined spatio-temporal patterns of behavior associated with the tracked objects across the image sequences appropriate alarm triggers are generated and transmitted to the display device 20.

Still referring to FIG. 1 the object tracking program 14 and the associated control data structures 16 could be installed in distinct platforms and/or devices distributed randomly across a Local Area Network (LAN) that could communicate over the LAN infrastructure or across Wide Area Networks (WAN). One example is a Radio Frequency Camera that transmits composite video remotely to a receiving station, the receiving station can be connected to other components of the system via a network or directly. The program 14 and the associated control data structures 16 could be installed in distinct platforms and/or devices distributed randomly across very wide area networks such as the Internet. Various forms of communication between the constituent parts of the system can be used. Such can be a data communication network, which can be connected via landlines or wireless or like communication devices and that can be implemented via TCP/IP protocols and like protocols. Other protocols and methods of communications, such as cellular, satellite, low band, and high band communications networks and devices will readily be useful in the implementation of the present invention. The program 14 and the associated control data structures 16 could be further co-located on the same computing platform or distributed across several platforms for load balancing, redundancy considerations, back-up in the case of equipment failure, and the like. Although on the drawing under discussion only a single image sequence source and a single computing and storage device is shown it will be readily perceived that in a realistic environment a plurality of image sequence sources could be connected to a plurality of computing and storage devices. Moreover, two image sequence sources each capturing a slightly different scene may provide a stereo image sequence source. Likewise, a multiplexed image sequence source from a plurality of image capturing devices may be used. The object tracking apparatus comprises an object tracking program and associated object tracking control data structures.

Figure 2:
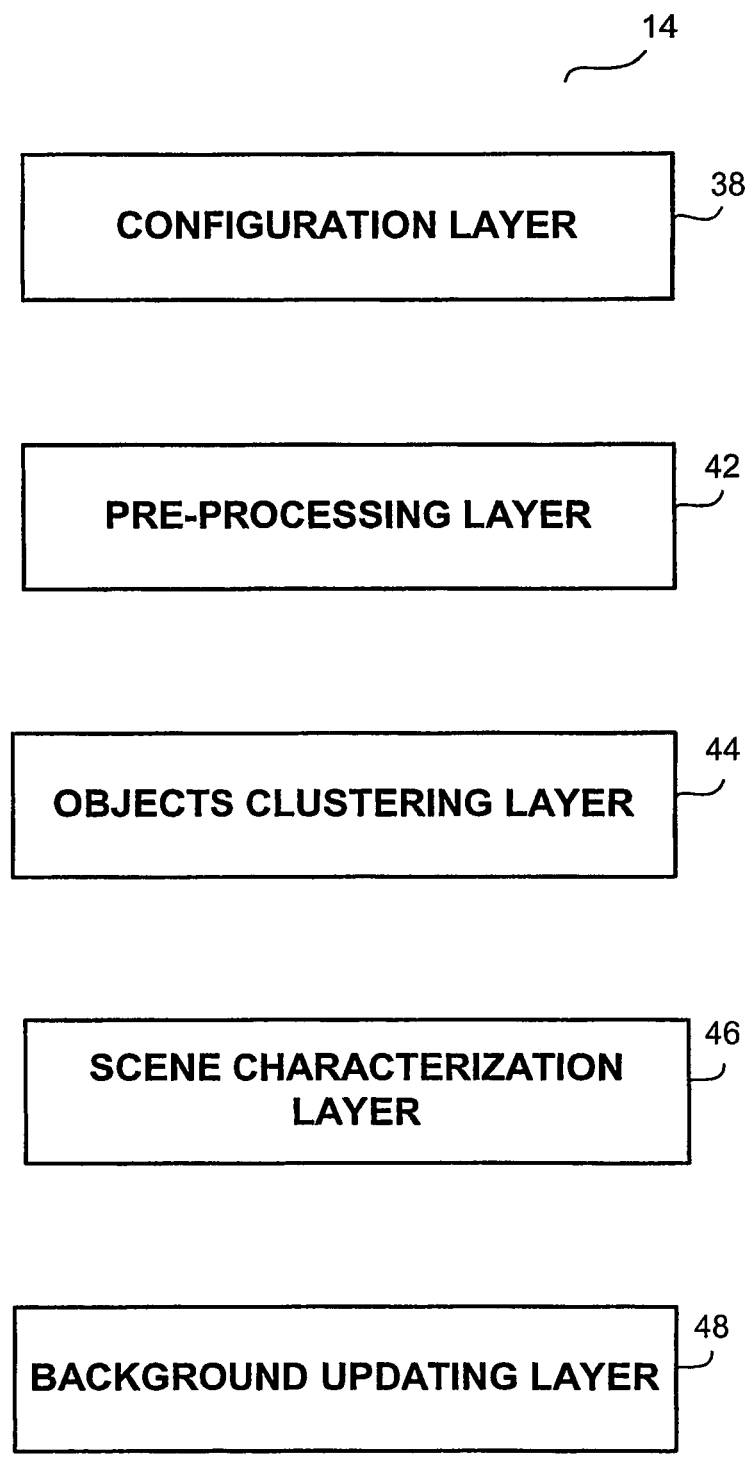
FIG. 2 is a high-level block diagram showing the application layers of the object tracking apparatus, in accordance with the preferred embodiment of the present invention.

Referring now to FIG. 2 which is a high-level block diagram showing the application layers of the object tracking apparatus of the present invention. The object tracking program 14 includes several application layers. Each application layer is a group of logically and functionally linked computer program components responsible for different aspects of the application within the apparatus of the present invention. The object tracking program 14 includes a configuration layer 38, a pre-processing layer 42, and an objects clustering layer 44, a scene characterization layer 46, and a background updating layer 48. Each layer is a computer program executing within the computerized environment shown in detail in association with the description of FIG. 1. The configuration layer 38 is a responsible for the initialization of the apparatus of the present invention in accordance with specific user-defined parameters. The pre-processing layer 42 is operative in constructing difference images between a currently captured video frame and previously constructed reference images. The objective of the objects clustering layer 44 is to generate new and or updated objects from the difference images and the existing objects. The scene characterization layer 46 uses the objects generated by the objects clustering layer 44 to describe the monitored scene. The layer 46 also includes a triggering mechanism that compares the behavior pattern and other characteristics of the objects to pre-defined behavior patterns and characteristics in order to create alarm triggers. The background updating layer 48 updates the reference images for the processing of the next frame. A more detailed description of the structure and functionality of the application layers will be provided herein under in association with the following drawings.

Figure 3:
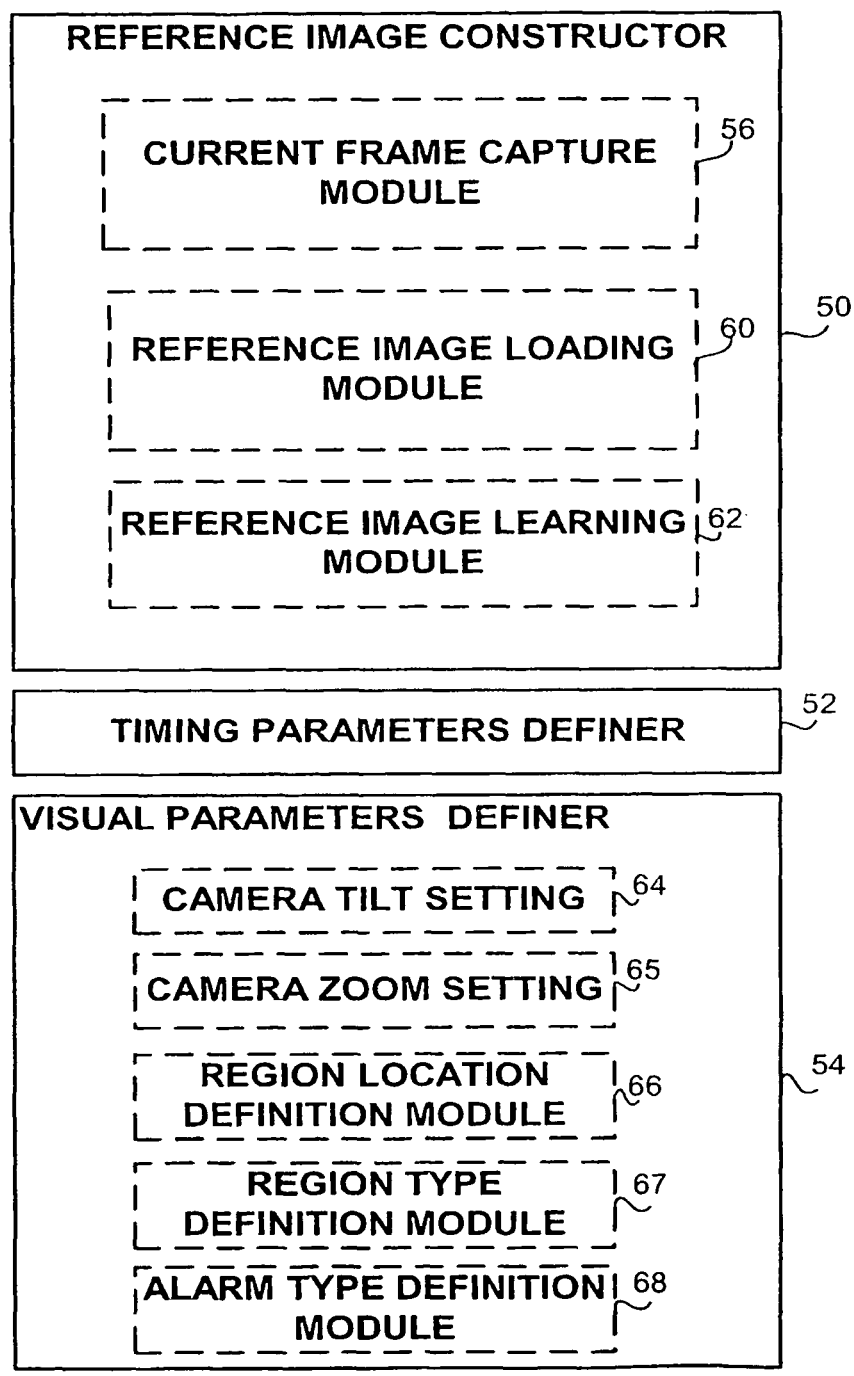
FIG. 3 is a block diagram illustrating the components of the configuration layer, in accordance with the preferred embodiment of the present invention.

Referring to FIG. 3 shows a block diagram illustrating the components of the configuration layer. The configuration layer 38 comprises a reference image constructor component 50, a timing parameters definer component 52, and a visual parameters definer component 54. The reference image constructor component 50 is responsible for the acquisition of the background model. The reference image is generated in accordance with a pre-defined option. The component 50 includes a current frame capture module 56, a reference image loading module 60, and a reference image learning module 62. In accordance with the pre-selected option the reference image may be created alternatively from; a) a currently captured frame, b) an existing reference image, c) a reference image learning module. The current frame capture module 56 provides a currently captured frame to be used as the reference image. The currently captured frame can be a frame from any camera covering the scene. The reference image loading module 60 provides the option for loading an existing reference image located on file locally or remotely. The user may select the appropriate image from the file and designate it as the reference image. The reference image learning module 62 provides the option that the reference image is generated adaptively learned from a consecutive sequence of captured images. The timing parameters definer component 52 provides time settings information, such as the number of time units to be elapsed before the generation of a trigger on a static object, and the like. The visual parameters definer component 54 provides the option to the user to define the geometry of the monitored scene. The component 54 includes, a camera tilt setting module 64, a camera zoom setting module 65, a region location definition module 66, a region type definition module 67, and an alarm type definition module 68. The module 64 derives the camera tilt in accordance with the measurements taken by a user of an arbitrary object located at different location in the monitored scene. The module 65 defines the maximum, the minimum and the typical size of the objects to be tracked. The region location definition module 66 provides the definition of the location of one or more regions-of-interest in the scene. The region type definition module 67 enables the user to define a region of interest as "objects track region" or "no objects track region". The alarm type definition module 68 defines a region of interest as "trigger alarm in region" or "no alarm trigger in region", in accordance with the definitions of the user.

Figure 4A:
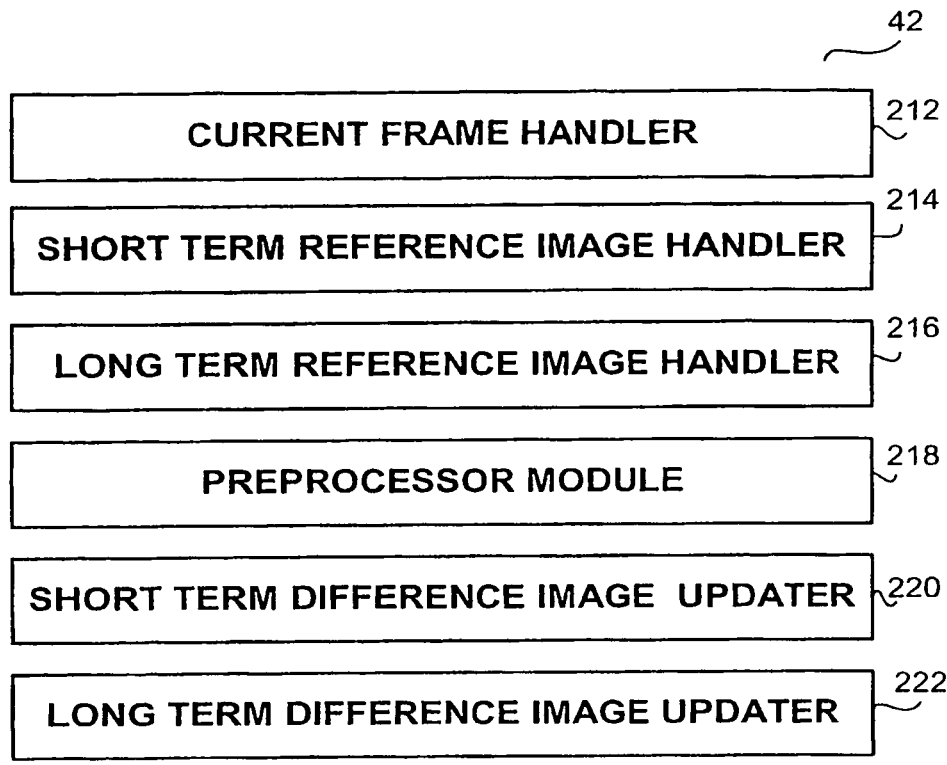
FIG. 4A is a block diagram illustrating the components of the pre-processing layer, in accordance with the preferred embodiment of the present invention.

Referring now to FIG. 4A showing a block diagram illustrating the components of the pre-processing layer, in accordance with the preferred embodiment of the present invention. The pre-processing layer 42 comprises a current frame handler 212, a short-term reference image handler 214, a long-term reference image handler 216, a pre-processor module, a short-term difference image updater 220, and a long-term difference image updater 222. Each module is a computer program operative to perform one or more tasks in association with the computerized system of FIG. 1. The current frame handler 212 obtains a currently captured frame and passes the frame to the pre-processor module 218. The short-term reference handler 214 loads an existing short-term reference image and passes the frame to the pre-processor module 218. The handler 214 could further provide calculations concerning the moments of the short term reference image. The long-term reference handler 216 loads an existing long-term reference image and passes the frame to the pre-processor module 218. The handler 216 could further provide calculations concerning the moments of the long term reference image.

The pre-processor module 218 uses the current frame and the obtained reference images as input for processing. The process generates a new short-term difference image and a new long-term difference image and subsequently passes the new difference images to the short-term reference image updater (handler) 220 and the long-term difference image updater (handler) 222 respectively. Using the new difference images the updater 220 and the updater 222 update the existing short-term reference image and the existing long-term reference image respectively.

Figure 4B:
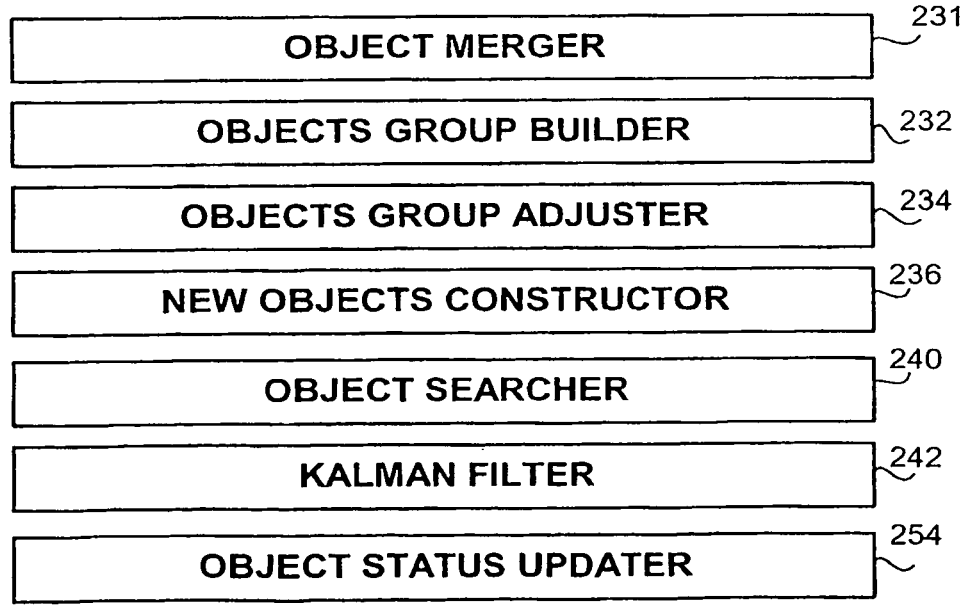
FIG. 4B is a block diagram illustrating the components of the clustering layer, in accordance with the preferred embodiment of the present invention.

Referring now to FIG. 4B showing a block diagram illustrating the components of the clustering layer, in accordance with the preferred embodiment of the present invention. The clustering layer 44 comprises an object merger module 231, an objects group builder module 232, an objects group adjuster module 234, a new objects creator module 236, an object searcher module 240, a Kalman filter module 242, and an object status updater 254. Each module is a computer program operative to perform one or more tasks in association with the computerized system of FIG. 1. The object merger module 231 corrects clustering errors by the successive merging of partially overlapping objects having the same motion vector for a pre-defined period. The objects group builder 232 is responsible for creating groups of close objects by using neighborhood relations among the objects. The object group adjuster 234 initiates a group adjustment processes in order to find the optimal spatial parameters of each object in a group. The new objects constructor module 236 constructs new objects from the difference images, controls the operation of a specific object location and size finder function and adjusts new objects. The new objects may be construed from the difference images whether existing objects are compared with or where there are no existing objects. For example, when the system begins operation a new object may be identified even if there are no previously acquired and existing objects. The object searcher 240 scans a discarded objects archive in order to attempt to locate recently discarded objects with parameters (such as spatial parameters) similar to a newly created object.

In order to improve accuracy of the tracking and in order to reduce the computing load a Kalman filter module 242 is utilized to track the motion of the objects. The object status updater 254 is responsible for modifying the status of the object from "static" to "dynamic" or from "dynamic" to "static". A detailed description of the clustering layer 44 will be set forth herein under in association with the following drawings.

Figure 5A:
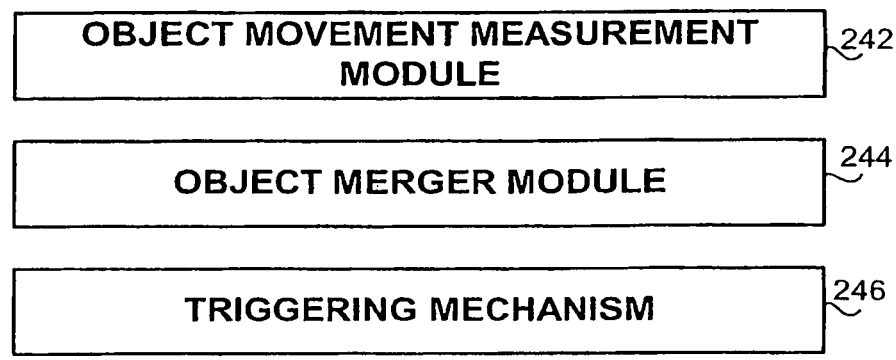
FIG. 5A is a block diagram illustrating the components of the scene characterization layer, in accordance with the preferred embodiment of the present invention.

Referring now to FIG. 5A showing a block diagram illustrating the components of the scene characterization layer, in accordance with the preferred embodiment of the present invention. The scene characterization layer 46 comprises an object movement measurement module 242, an object merger module 244, and a triggering mechanism 246. The object movement measurement module 242 analyzes the changes in the spatial parameters of an object and determines whether the object is moving or stationary. The object merger module 244 is responsible for correcting errors to objects as a result of the clustering stage. The functionality of the triggering mechanism 246 is to check each object against the spatio-temporal behavior patterns and properties defined as "suspicious" or as alarm triggering. When a suitable match is found the mechanism 246 generates an alarm trigger. The operation of the scene characterization layer 46 will be described herein under in association with the following drawings.

Figure 5B:
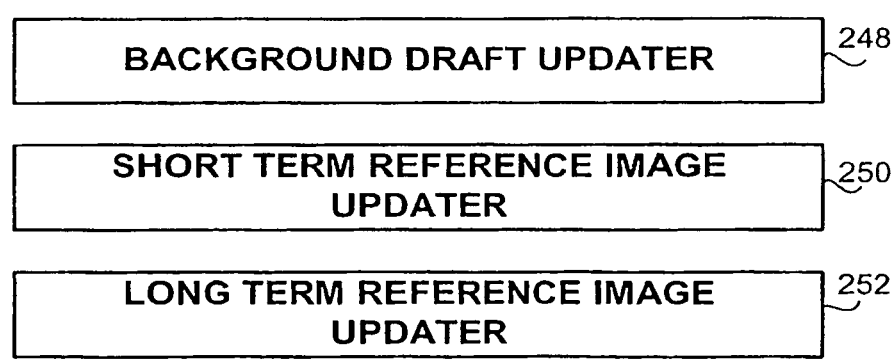
FIG. 5B is a block diagram illustrating the components of the background update layer, in accordance with the preferred embodiment of the present invention.

Referring now to FIG. 5B showing a block diagram illustrating the components of the background update layer, in accordance with the preferred embodiment of the present invention. The background updating layer 48 comprises a background draft updater 248, a short-term reference image updater 250, and a long-term reference image updater 252. The functionality of the updater 248 is to update continuously the background or reference "draft" frame from the current frame. The short-term reference image updater 250 and the long-term reference image updater 252 maintain the short-term reference image and the long-term reference image, respectively. A detailed description of the operation of the background-updating layer 48 will be provided herein under in association with following drawings.

Figure 6:
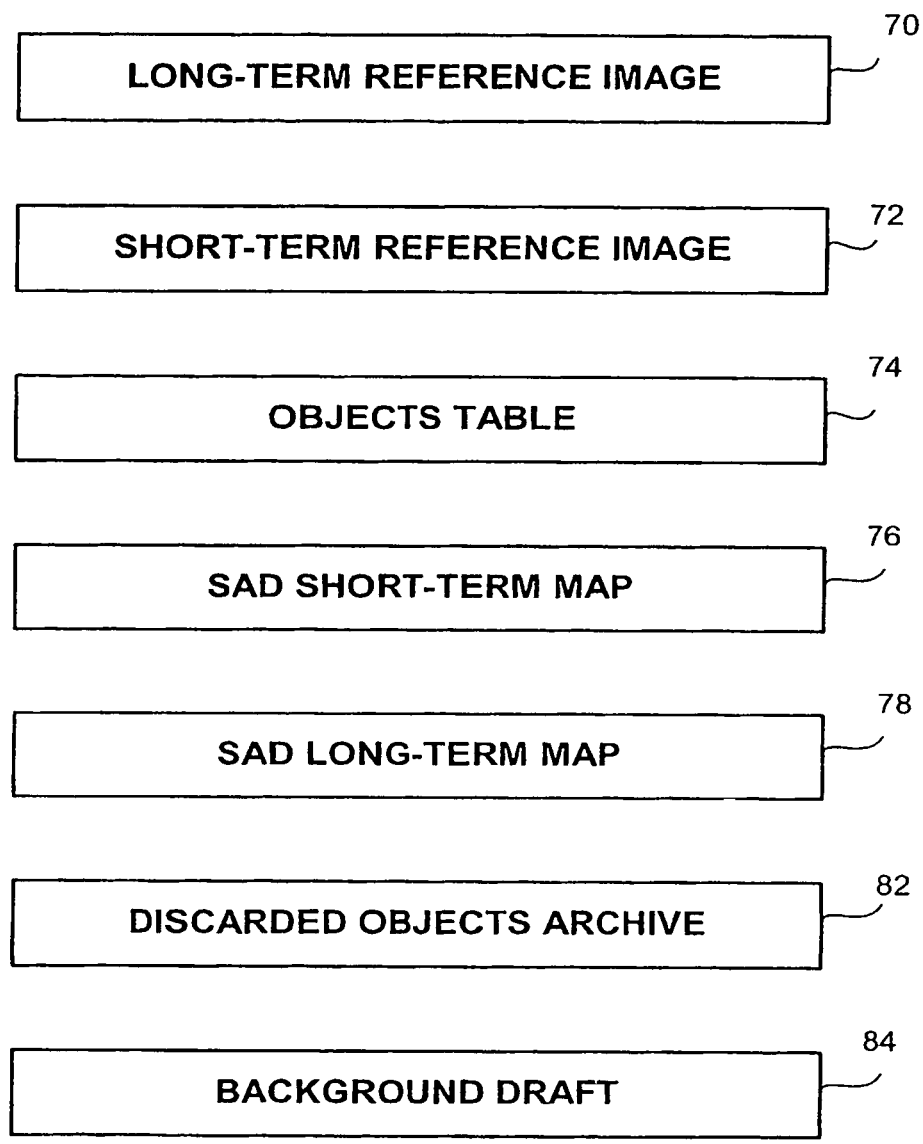
FIG. 6 is a block diagram showing the data structures associated with the object tracking apparatus, in accordance with a preferred embodiment of the present invention.

Referring now to FIG. 6 showing a block diagram of the data structures associated with the object tracking apparatus, in accordance with a preferred embodiment of the present invention. The object tracking control structures 16 of FIG. 1 comprise a long-term reference image 70, a short-term reference image 72, an objects table 74, a sophisticated absolute distance (SAD) short-term map 76, a sophisticated absolute distance (SAD) long-term map 78, a discarded objects archive 82, and a background draft 84. The long-term reference image 70 includes the background image of the monitored scene without the dynamic and without the static objects tracked by the apparatus and method of the present invention. The short-term reference image 72 includes the scene background image and the static objects tracked by the object tracking method. The objects table includes a list of dynamic and static objects with associated object data and object meta data. The object data includes object identification, objects status, and various control fields, such as a non-moving counter, non-moving-time counter, and the like. The meta data comprises information concerning the current spatial parameters, the properties and the motion vector data of the objects acquired from the previously performed processing on a succession of previous frames. The short-term and long-term sophisticated difference maps (SADs) 76, 78 represent the difference between a currently captured frame and the short-term and long-term reference images 78, 80. The discarded object archive 82 stores discarded objects for object history. The background draft 84 (also referred to as the reference image, but not the short-term or long-term reference images) is a constantly changing image of the monitored scene. Each pixel within each current frame is taken into consideration when calculating the background draft 84. The draft 84 is used for inserting "static" objects to the short-term reference image 72. The background draft 84 constantly reviews the scene background. If an object enters the monitored scene, such object is inserted into the background draft 84. When the method determines that the object is a "static" object (after the object was perceived as stationary across a pre-defined number of captured frames) the pixels of the object are copied from the background draft 84 to the short-term reference image 72.

Figure 7:
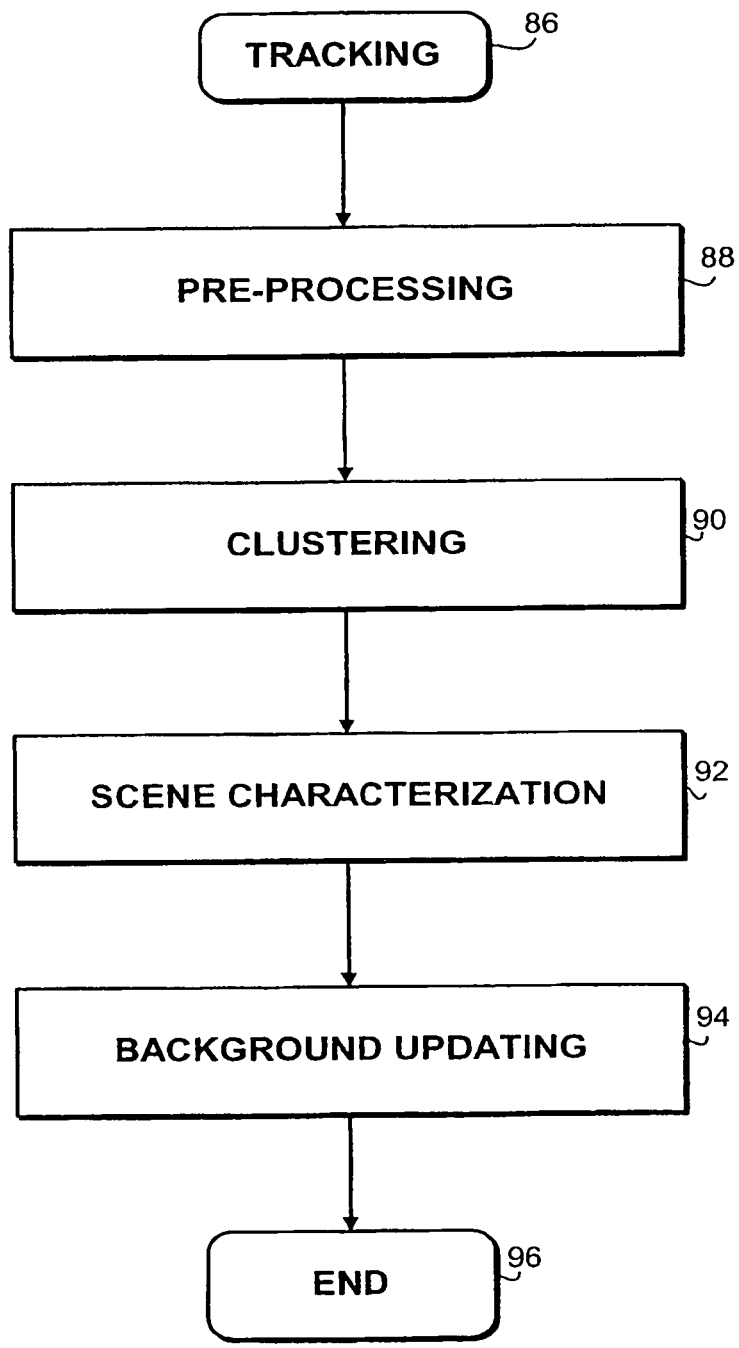
FIG. 7 illustrates the operation of the object tracking method, in accordance with the preferred embodiment of the present invention.

Referring now to FIG. 7, the object tracking module operates by detecting objects across a temporally ordered sequence of consecutively captured images where the objects do not belong to the "natural" or "static" monitored scene. The object tracking module operates through the use of a central processing unit (not shown) utilizing data structures (not shown). The data structures are maintained on one or more memory or storage devices installed across a hardware environment supporting the application. FIG. 7 illustrates the various steps in the operation of the object tracking method. The configuration step (not shown) is performed prior to the beginning of the tracking (steps 88 through 94). In the configuration step the object-tracking module is provided with reference images, with timing parameters and with visual parameters, such as regions-of-interest definitions. The provided information enables the method to decide which regions of the frame to work on and in which regions should an alert situation be produced. The configuration step optionally includes a reference image learning step (not shown) in which the background image is adaptively learned in order to construct a long-term and a short-term reference image from a temporally consecutive sequence of captured images. When no stationary objects were detected in the last frames the long-term reference image is copied and maintained as a short-term reference picture. The long-term reference image contains no objects while the short-term reference image includes static objects, such as objects that have been static for a pre-defined period. In the preferred embodiment of the invention, the length of the pre-defined period is one minute while in other preferred embodiments other time values could be used. The long-term reference image and the short-term reference image are updated for background changes, such as changes in the illumination artifacts associated with the image (lights or shadows or constantly moving objects (such as trees) and the like). The video frame pre-processing phase 88 uses a currently captured frame and the short-term and long-term reference images for generating new short-term and long-term difference images. The difference images represent the difference between the currently captured frame and the reference images. The reference images can be obtained from one of the image sequence sources described in association with FIG. 1 or could be provided directly by a user or by another system associated with the system of the present invention. The difference images are suitably filtered or smoothened. The clustering phase 90 generates new or updated objects from the difference images and from the previously generated or updated objects. The scene characterization phase 92 uses the objects received from the clustering phase 90 in order to describe the scene. The background updating step 94 updates the short-term and long-term reference images for the next frame calculation. Note should be taken that in other preferred embodiments of the invention other similar or different processes could be used to accomplish the underlying objectives of the method of the present invention.

Note should be taken that proposed apparatus and method is provided the capability of functioning in specific situations where an image acquiring device, such as a video camera, is not static. Examples for such situations include a pole-mounted outdoor camera operating in windy conditions or mobile a camera physically tacking a moving object. For such situations the object tracking method requires a pre-pre-processing phase configured such as to compensate for the potential camera movements between the capture of the reference images and the capture of each current frame. The pre-pre-processing phase involves an estimation of the relative overall frame movement (registration) between the current frame and the reference images. Consequent to the estimation of the registration (in terms of pixel offset) the offset is applied to the reference images in order to extract "in-place" reference images for the object tracking to proceed in a usual manner. As a result, extended reference images have to be used, allowing for margins (the content of which may be constantly updated) up to the maximal expected registration.

The estimation of the registration (offset) between the current frame and the reference images involves a separate estimation of the x and y offset components, and a joint estimation of the x and y offset components. For the separate estimation, selected horizontal and vertical stripes of the current frame and the reference images are averaged with appropriate weighting, and cross-correlated in search of a maximum match in the x and y offsets, respectively. For the joint estimation, diagonal stripes are used (in both diagonal directions), from which the x and y offsets are jointly estimated. The resulting estimates are then averaged to produce the final estimate.

Figure 8:
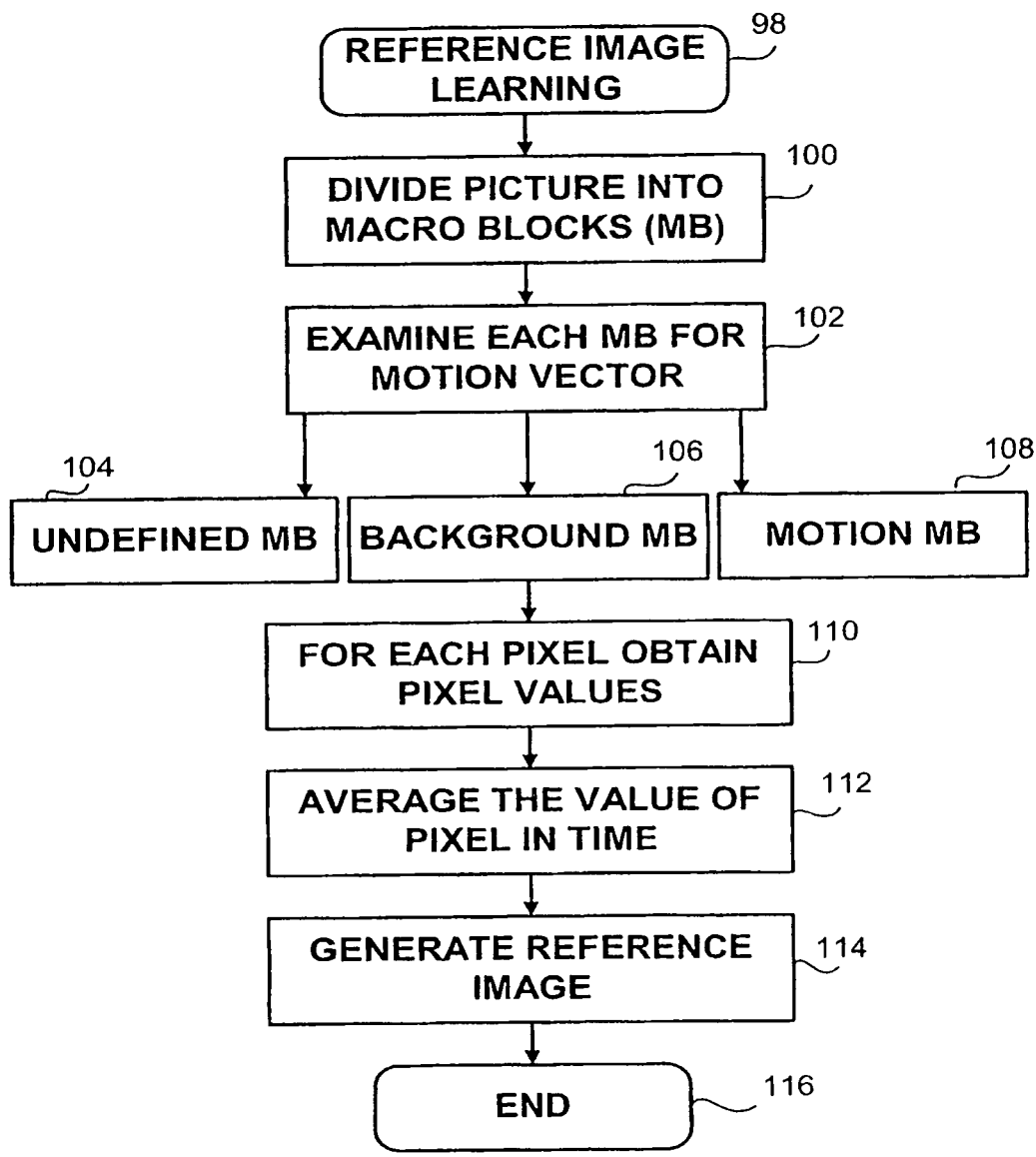
FIG. 8 describers the operation of the reference image learning routine, in accordance with a preferred embodiment of the present invention.

Referring now to FIG. 8 which describers the operation of the reference image learning routine, in accordance with a preferred embodiment of the present invention. The construction of the long-term and short term reference images could be carried out in several alternative ways. A currently captured frame could be stored on a memory device as the long-term reference image. Alternatively, a previously stored long-term reference image could be loaded from the memory device in order to be used as the current long-term reference image respectively. Alternatively, a specific reference image learning process could be activated (across steps 100 through 114). In step 100 the reference image learning process is performed across a temporally consecutive sequence of captured images where each of the frames is divided into macro blocks (MB) having a pre-defined size, such as 16×16 pixels or 32×32 pixels or any like other division into macro blocks. Next at step 102 each MB is examined for motion vectors. The motion is detected by comparing the MB in a specific position in currently captured frame to the MB in the same position in the previously captured frame. The comparison is performed during the encoding step by using similar information generated therein for video data compression purposes. According to the result of the examination each MB is marked as being in one of the following three states; a) Motion MB 108 where a motion vector is detected in the current MB relative to the parallel MB in the previously captured frame, b) Undefined MB 104 where no motion vector is detected in the MB relative to the parallel MB in the previously captured frame but motion vector was detected across a previously captured set of temporally consecutive frames where the sequence is defined as having a pre-defined number of frames. In the preferred embodiment of the invention the number of frames in the sequence is about 150 frames while in other preferred embodiments of the invention different values could be used, c) Background MB 106 where no motion vector was detected across the previously captured sequence of temporally consecutive frames. In step 110 the values of each of the pixels in an MB that were identified as a Background MB are obtained and in step 112 the values are averaged in time 112. In step 114 an initial short term and long term reference image is generated from the values average in time. In order to avoid undetermined values for pixels in the MBs that were always in motion, such as an MB wherein there was a constant motion (trees moving in wind), in step 114 the short-term reference image is created such that it contains the averages of the values of pixels in time. Subsequently, the pixels are examined in order to find which pixels had insufficient background time (MBs that were always in motion). Pixels without sufficient background time are given the value from the short-term reference image.

Figure 9:
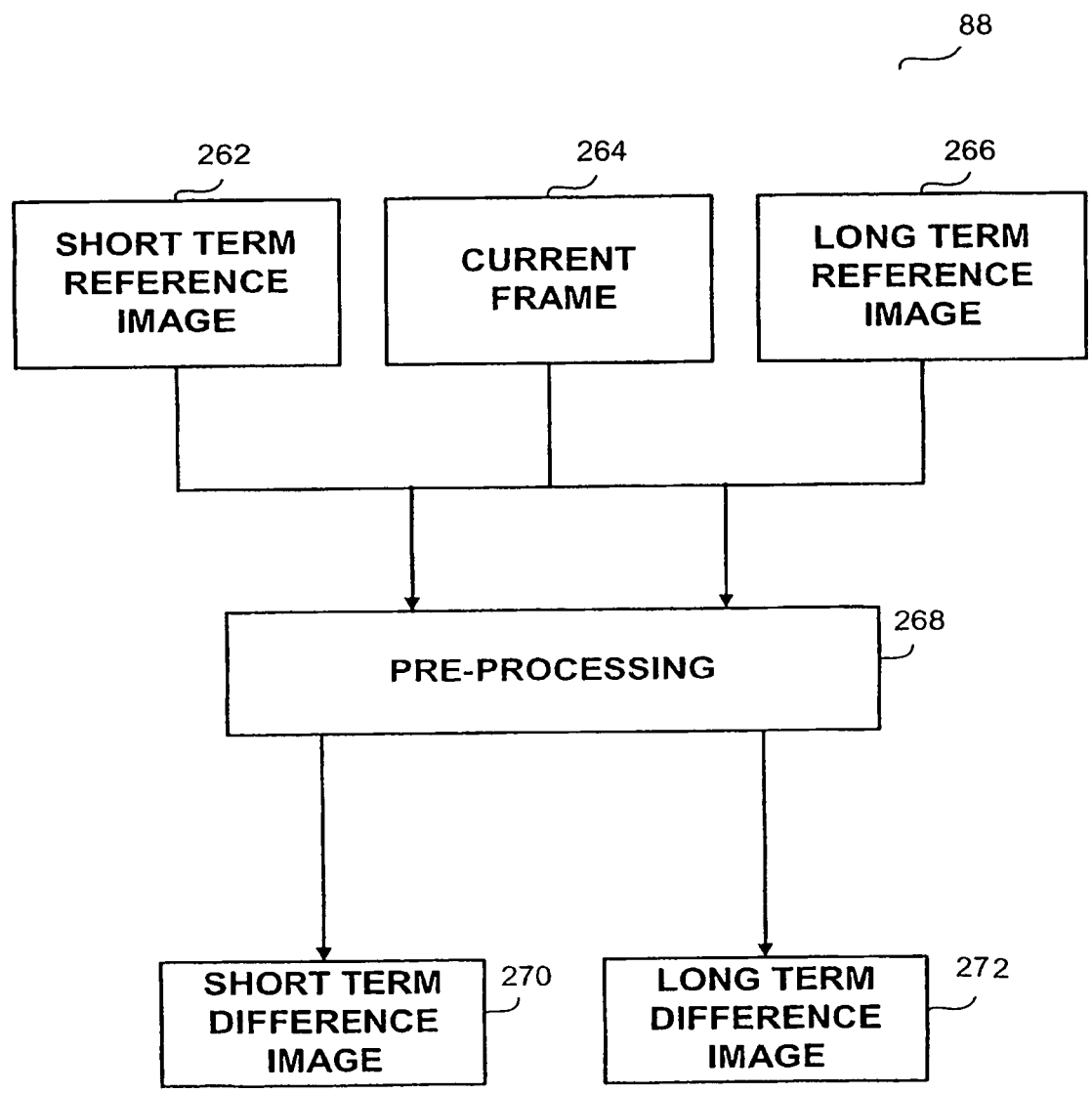
FIG. 9 shows the input and output data structures associated with the pre-processing layer, in accordance with a preferred embodiment of the present invention.

Referring now to FIG. 9 showing the input and output data structures associated with the pre-processing layer, in accordance with a preferred embodiment of the present invention. The pre-processing step 88 of FIG. 6 employs the current frame 264 and the short-term reference image 262 to generate a short-term difference image 270. The step 88 further uses the current frame 264 and the long-term reference image 266 to generate a long-term difference image 272. The long-term 272 and short-term 270 difference images represent respectively the sophisticated absolute difference (SAD) between the current frame 264 and the long-term 266 and the short-term 262 reference images. The size of the difference images (referred to herein after as SAD maps) 270, 272 is equal to the size of the current frame 264. Each pixel in the SAD maps 270, 272 are provided with an arbitrary value in the range of 1 through 101. Other values may be used instead. High values indicate a substantial difference between the value of the pixel in the reference images 262, 266 and the value of the pixel in the currently captured frame 264. Thus, the score indicates the probability for the pixel belonging either to the scene background or to an object. The generation of the SAD maps 270, 272 is achieved by performing one of two alternative methods.

Still referring to FIG. 9, in the first pre-processing method for each specific pixel in the currently captured frame 264 the absolute difference between the specific pixel and the matching pixel in the reference images 262, 266 is calculated where the calculation takes into account the average pixel value:

$$D(x,y) = a0 \times Y\min(x,y) + a1 \times Y\max(x,y) + a3 \quad (1)$$

In the above equation the values of x, y concern the pixel coordinates. The values of Ymin and of Ymax represent the lower and the higher luminance levels at (x, y) between the current frame 264 and the reference images 262, 266. The values of a1, a1, and a3 are thresholds designed to minimize $D(x, y)$ for similar pixels and maximize it for non-similar pixels. Consequent to the performance of the above equation for each of the pixels and to the generation of the SAD maps 270, 272 the SAD maps 270, 272 are filtered for smoothing with two Gaussian filters one in the X coordinate and the second in the Y coordinate.

In the second alternative pre-processing method, around each pixel $P(x, y)$ the following values are calculated where the calculation uses a 5×5 pixels neighboring window for filtering. This step could be referred to as calculating the moments of each pixel.

$$M00(x, y) = \sum_{i=x-2}^{x+2} \sum_{j=y-2}^{y+2} P(i, j) \quad (2)$$

$$M10(x, y) = \frac{32 * \sum_{i=x-2}^{x+2} \sum_{j=y-2}^{j=y+2} (x-i)P(i, j)}{M00(x, y)}$$

$$M01(x, y) = \frac{32 * \sum_{i=x-2}^{x+2} \sum_{j=y-2}^{y+2} (y-j)P(i, j)}{M00(x, y)}$$

The results of the equations represent the following values: a) M00 is the sum of all the pixels around the given pixel, b) M10 is the sum of all the pixels around the given pixel each multiplied by a filter that detects horizontal edges, and c) M01 is the sum of all the pixels around a given pixel multiplied by a filter that detects vertical edges. Next, the absolute difference between these three values in the current frame 264 and the reference images 270, 272 is performed. In addition the minimum of M00Curr and M00Ref are calculated.

$$D00(x,y) = |M00\text{curr}(x,y) - M00\text{ref}(x,y)| \quad (3)$$

$$D10(x,y) = |M10\text{curr}(x,y) - M10\text{ref}(x,y)|$$

$$D01(x,y) = |M01\text{curr}(x,y) - M01\text{ref}(x,y)|$$

$$\text{Min}(x,y) = \min(M00\text{curr}(x,y), M00\text{ref}(x,y))$$

Next the following equations are used to construct the desired SAD maps 270, 272:

$$\begin{aligned} &Tmp1(x, y) = A0 * (D00(x, y) + W0) - \text{Min}(x, y) \quad (4)\\ &Tmp2(x, y) = A1 * D10(x, y) + W1\\ &Tmp3(x, y) = A1 * D01(x, y) + W1\\ &A0 = 15,\\ &A1 = 25\\ &W0 = -40\\ &W1 = -44 \end{aligned}$$

-continued $$Tmp1(x, y) = \min(32, Tmp1(x, y)) \quad (5)$$
$$Tmp1(x, y) = \max(-32, Tmp1(x, y))$$
$$Tmp2(x, y) = \min(32, Tmp2(x, y))$$
$$Tmp2(x, y) = \max(-32, Tmp2(x, y))$$
$$Tmp3(x, y) = \min(32, Tmp3(x, y))$$
$$Tmp3(x, y) = \max(-32, Tmp3(x, y))$$

$$TmpSADMap(x, y)' = \frac{3*(Tmp1(x, y) + Tmp2(x, y) + Tmp3(x, y) + 32)}{64} \quad (6)$$

Through a convolution calculation the grade for each pixel is calculated while taking into consideration the values for the pixels neighbors:

$$SADMap(x, y) = 1 + \sum_{i=x-2}^{x+2}\sum_{j=y-2}^{y+2} TmpSADMap(i, j) \quad (7)$$

$$SADMap(x, y) = \min(SADMap(x, y), 101)$$

The method takes into consideration the texture of the current frame 264 and the reference images 262, 266 and compares there between. The second pre-processing method is favorable since it is less sensitive to light changes At the price of increased computational cost, in order to achieve a more accurate model optionally higher moments could be calculated. Calculating higher moments involves the performance of the following set of equations:

$$M20(x, y) = \frac{\sum_{i=x-2}^{x+2}\sum_{j=y-2}^{y+2}(x-i)^2 * P(i, j)}{M00} \quad (8)$$

$$M02(x, y) = \frac{\sum_{i=x-2}^{x+2}\sum_{j=y-2}^{y+2}(y-j)^2 * P(i, j)}{M00}$$

$$M11(x, y) = \frac{\sum_{i=x-2}^{x+2}\sum_{j=y-2}^{y+2}(y-j)*(x-i) * P(i, j)}{M00}$$

It will be easily perceived that the method could be broadened for even higher moments. Several equations of the second pre-processing method represent a simulation of a neural network.

Figure 10A:
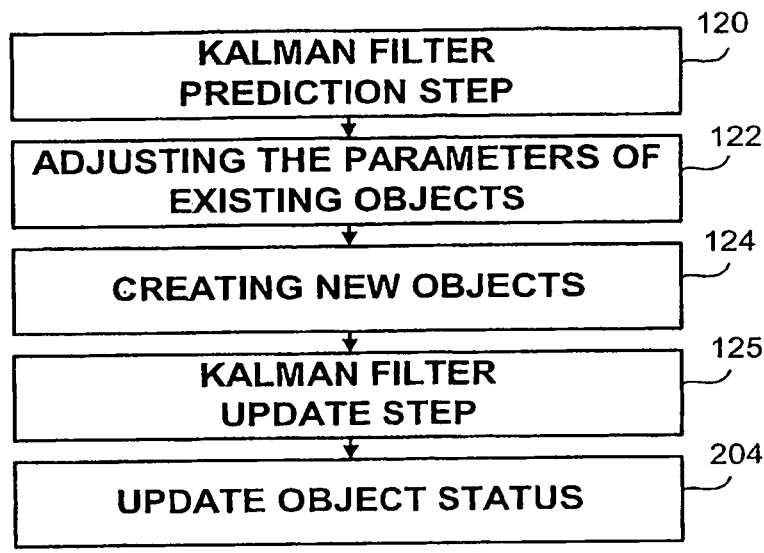
FIGS. 10A, 10B and 10C describe the operational steps associated with the clustering layer, in accordance with the preferred embodiment of the present invention.

The pre-processing step produces several outputs that are used by the clustering step. Such outputs are the short-term and long-term SAD maps. Each pixel in the SAD maps is assigned a value in the range of 1 through 100. High values indicate great difference between the value of the pixel in the reference images and the value of the pixel in the current frame. The purpose of the clustering is to cluster the high difference pixels into objects. Referring now to FIG. 10A the clustering step 120 includes a two-stage Kalman filtering, two major processing sections, and an object status updating. In order to improve accuracy of the tracking and in order to reduce the computing load a Kalman filter is used to track the motion of the objects. The Kalman filter is performed in two steps. The prediction step 120 is performed before the adjustment of the objects and the update step 125 is performed after the creation of a new object. The Kalman state of the object is updated in accordance with the adjusted parameters of the object. At step 204 the status of the object is updated. The changing of the object status from "dynamic" status to "static" status is performed as follows: If the value of the non-moving counter associated with the object exceeds a specific threshold then the status of the object is set to "static". The dead-area (described in the clustering step) is calculated and saved. The pixels that are bounded within the object are copied from the background draft to the short-term reference image. Subsequently, the status of the object is set the "static". Static objects are not adjusted until their status is changed back to "dynamic".

Still referring to FIG. 10A in the processing step 122, in order to perform tracking of the objects that were detected in the previous video frames, the parameters of the existing objects are adjusted. In the processing step 124 new objects are created from all the high value pixels that do no belong to the already created objects. The adjustment of the object parameters is done for every group of objects. The objects are divided into groups in accordance to their location. Objects of a group are close to each other and might occlude each other. Objects from different groups are distant from each other. The adjustment of groups of objects provides for the appropriate handling of occlusion situations.

Figure 10B:
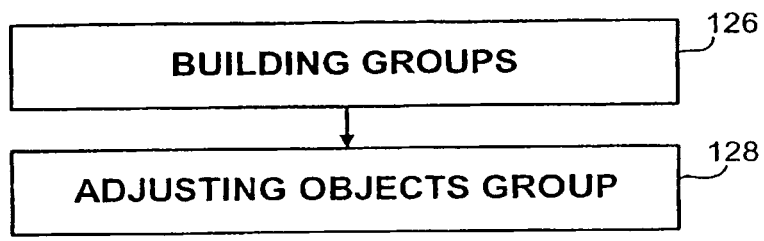

Referring now to FIG. 10B at step 126 the objects groups are built. An object-specific bounding ellipse represents each object. The functionality, structure and operation of the ellipse will be described herein after in association with the following drawings. Every two objects are identified as neighbors if the minimum distance between their bounding ellipses is up to about 4 pixels. Using the neighborhood relations between every two objects, the object groups are built. Note should be taken that static objects are not adjusted. At step 128 the parameters of the existing dynamic objects are adjusted in order to perform tracking of the objects detected in the previously captured video frames. The objects are divided into groups according to their locations. Objects of a group are close to each other and may occlude each other. Objects belonging to different groups are distant from each other. The adjustment of the object parameters is performed for every group of objects separately. The adjustment to groups of objects enables appropriate handling of occlusion situations. At step 126 groups of objects are built. Each object is represented by a bounding marker, which a distinct artificially generated graphical structure, such as an ellipse. A pair of objects is identified as two neighboring members if the minimum distance between their marker ellipses is up to a pre-defined number of pixels. In the preferred embodiment of the invention the pre-defined number of pixels is 4 while in other embodiments different values could be used. Using the neighborhood relations between all the pairs of objects the object groups are built. At step 128 the object groups are adjusted. The object group adjustment process determines the optimal spatial parameters of each object in the objects group. Each set of spatial parameter values of all the objects in a given objects group is scored. The purpose of the adjustment process is to find the spatial parameters of each object in a group, such that the total score of the group is maximized. The initial parameters are the values generated for the previously captured frame. The initial base score is derived from a predictive Kalman filter. In each adjustment iteration, a pre-defined number of geometric operations are performed on the objects. The operations effect changes in the parameters of every object in the group. Various geometric operations could be used, such as translation, scaling (zooming), rotation, and the like. In the preferred embodiment of the invention, the number of geometric operations applied to the object is 10 while in other preferred embodiments different values could be applied. In the preferred embodiment of the invention, the following geometrical operations with the respective values are used: a) Translation right on axis 1, b) Translation left on axis 1, c) Translation right on axis 2, d) Translation left of axis 2, e) Down-scaling by shrinking axis 1, f) Up-scaling by blowing axis 1, g) Down-scaling by shrinking axis 2, h) Up-scaling by blowing axis 2, i) Rotation to the left through 5 degrees, and j) Rotation to the right through 5 degrees. The score of every change is measured and saved in a table. The structure and the constituent elements of the table are described via a representation of an exemplary table as follows:

| Adj 1 | Adj 2 | Adj 3 | Adj 4 | Adj 5 | Adj 6 | Adj 7 | Adj 8 | Adj 9 | Adj 10 |
|---|---|---|---|---|---|---|---|---|---|
| 100 | 102 | 101 | 105 | 104 | 108 | 110 | 108 | 100 | 120 |
| 150 | 80 | 105 | 104 | 110 | 112 | 114 | 121 | 119 | 120 |
| 123 | 121 | 112 | 114 | 119 | 117 | 109 | 108 | 105 | 101 |

In the example above there are 3 objects in the group where each row represents an object. The 10 adjustments performed on each object are represented by the results shown in each row. Performing adjustment 1 to the $2^{nd}$ object yields the maximum score for the group. Thus, adjustment 1 will be applied to the parameters of the $2^{nd}$ object. The score is weighted by the non-movement-time of the object. As a result the algorithm tends not to perform changes on objects that were not in movement for a significant period. The iterative process is performed in order to improve the score of the group as much as possible. The iterative process stops if at last one of the following conditions is satisfied: a) the highest score found in the iteration is no greater than the score at the beginning of the iteration, and b) at least twenty iterations have been completed.

In order to reduce the computational load, every ellipse parameter is changed according to the movement thereof as derived by a Kalman filter used to track after the object. If the score of the group is higher than the base score the change is applied and the new score will become the base score.

In order to handle occlusions a "united object" is built, which is a union of all the objects in the group. Thus, each pixel that is associated with more than one object in the group, will contribute its score only once and not for every member object that wraps it. The contribution of each pixel in the SAD map to the total score of the group is set in accordance with the value of the pixel.

$$\text{Contribution} = \begin{cases} +2 & HighTH < \text{val} \\ +1 & LowTH < \text{val} < HighTH \\ -1 & \text{val} < LowTH \end{cases} \quad (9)$$

Subsequent to the completion of the about 10 iterations, specific object parameters associated with each group object are tested against specific thresholds in order to check whether the object should be discarded. The object parameters to be tested are the minimum object area, the minimum middle score, the maximum dead area, and the overlap ratio.

a) Maximum object area concerns a threshold value limiting the minimum permissible spatial extent for an object. If the maximum object area is smaller than the value of a pre-defined threshold then the object is discarded. So for example random appearance of non-real objects or dirty lenses providing random dark pixels are cleaned effectively.

b) Minimum middle score relates to the score of a circle that is bounded in the ellipse representing the object. If the score of the circle is below a pre-defined value of an associated threshold then the object is eliminated. A low-score circle indicates a situation where two objects were in close proximity in the scene and thus represented on object (one ellipse) and then they separated. Thus, the middle of the ellipse will have a lower score than the rest of the area of the object.

c) Maximum dead area concerns an object that includes a large number of low value pixels. If the number of such pixels is higher than an associated threshold value then the object is discarded.

d) Overlap ratio regards occlusion situations. Occlusion is supported up to about 3 levels. If most of the object is occluded by about 3 other objects for a period of about 10 seconds, the object is a candidate to be discarded. If there is more than one object in that group that should be eliminated then the most recently moving object is discarded.

Subsequent to the completion of the parameters testing procedure the non-discarded objects are cleared from the SAD map by setting the value of the set of pixels bounded in the object ellipse to zero. The discarded objects are saved in the discarded objects archive to be utilized as object history. The data of every new object will be compared against the data of the recently discarded objects stored in the archive in order to provide the option of restoring the object from the archive.

Figure 10C:
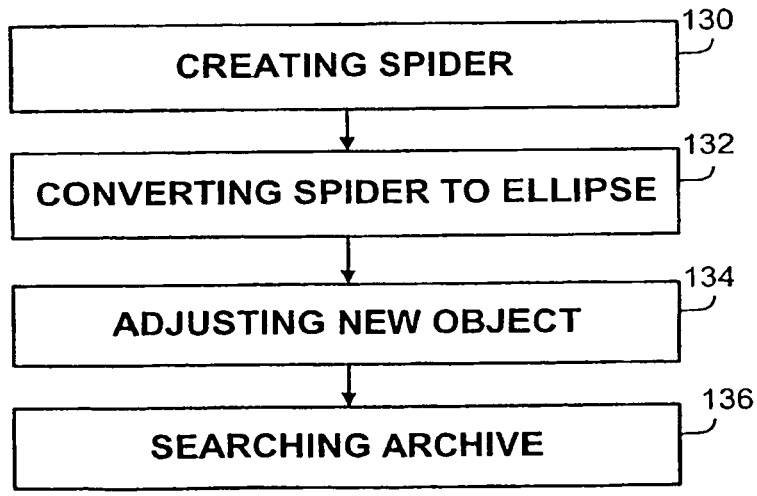

Referring now to FIG. 10C consequent to the adjustment of the existing objects, the pixels in the SAD map are provided with values in the range of 0 through 100. A value of zero means that the pixel belongs to an existing object. The drawing shows the steps in the creation of new objects. The construction of a new object is based a pixel having a high value in the SAD map. The procedure starts by searching for a free entry in the objects table 74 of FIG. 5 in order to enable the storage of the parameters of a new object (not shown). The high value pixel is assumed to be the center of the object. In order to derive the boundary of the new object a specific boundary locater function, referred to herein after as the "spider function" is activated at step 130. The spider function includes a set of program instructions associated with a control data structure. The control data structure contains location and size data that define the spatial parameters of a spider-like graphical structure. The spider-like structure is provided with about 16 extensible members (arms) uniformly divided across 360 degrees. The extensible members of the spider-like structure are connected to the perceived center of the new object and dynamically radiate outward. The length of each extensible member is successively increased until the far end of spatially each member is aligned with a pixel having a high value in the SAD map. In order to handle small gaps in the object "bridging" line segments of up to 4 pixels are allowed. Thus, if there are more than 4 continuous low value pixels in the direction of the radiation, the extension of a member will be discontinued. The member-specific final coordinates are saved in X, Y arrays in the control data structure, respectively, in order to indicate the suitable boundary points constituting the boundary line of the new object. Next, in order to improve accuracy the central point of the spider structure is re-calculated from the X, Y arrays, as follows:

$$y_c = \frac{1}{16} \sum_{k=0}^{15} Y[k] \quad (10)$$

-continued $$x_c = \frac{1}{16}\sum_{k=0}^{15} X[k]$$

Then, subsequent to the re-location the central point of the structure at the Yc, Xc pixel coordinates the spider structure is re-built. Extending the about 16 extensible members of the spider structure yields two Y[16] and X[16] arrays. If the spatial extent of the spider structure is sufficient the parameters of the boundary ellipse are calculated. If the spatial extent of the spider overlaps the area of an existing object the new object will not be created unless its size is above a minimum threshold.

Still referring to FIG. 10C at step 132 the spider-like graphical structure is converted to an ellipse-shaped graphical structure. An ellipse is provided with 5 parameters calculated from the X, Y arrays as follows:

$$M_x = \frac{1}{16}\sum_{k=0}^{15} X[k] \quad (11)$$

$$M_y = \frac{1}{16}\sum_{k=0}^{15} Y[k]$$

$$C_{xx} = \frac{1}{16}\sum_{k=0}^{15} (X[k] - M_x)^2$$

$$C_{xy} = \frac{1}{16}\sum_{k=0}^{15} (X[k] - M_x)(Y[k] - M_y)$$

$$C_{yy} = \frac{1}{16}\sum_{k=0}^{15} (Y[k] - M_y)^2$$

The covariance matrix of the ellipse is:

$$C = \begin{bmatrix} C_{xx} & C_{xy} \\ C_{xy} & C_{yy} \end{bmatrix} \quad (12)$$

The ellipse covariance matrix is scaled to wrap the geometric average distance. The covariance matrix is multiplied by where F is calculated in the following manner $$d_k = [X[k] \ Y[k]] \cdot C^{-1} \cdot \begin{bmatrix} X[k] \\ Y[k] \end{bmatrix} \quad k = 0 \ldots 15 \quad (13)$$

$$F = \left(\prod_{k=0}^{15} d_k\right)^{1/16}$$

At step 134 the new object is adjusted via the utilization of the same adjustment procedure used for adjusting existing objects. The discarded objects archive includes recently discarded objects. If the spatial parameters, such as location and size, of a recently discarded object are similar to the parameters of the new object, the discarded object is retrieved from the archive and the tracking thereof is re-initiated. If no similar object is found in the archive then the new object will get a new object ID, and the new object's data and meta data will be inserted into the objects table. Subsequently tracking of the new object will be initiated.

Figure 11:
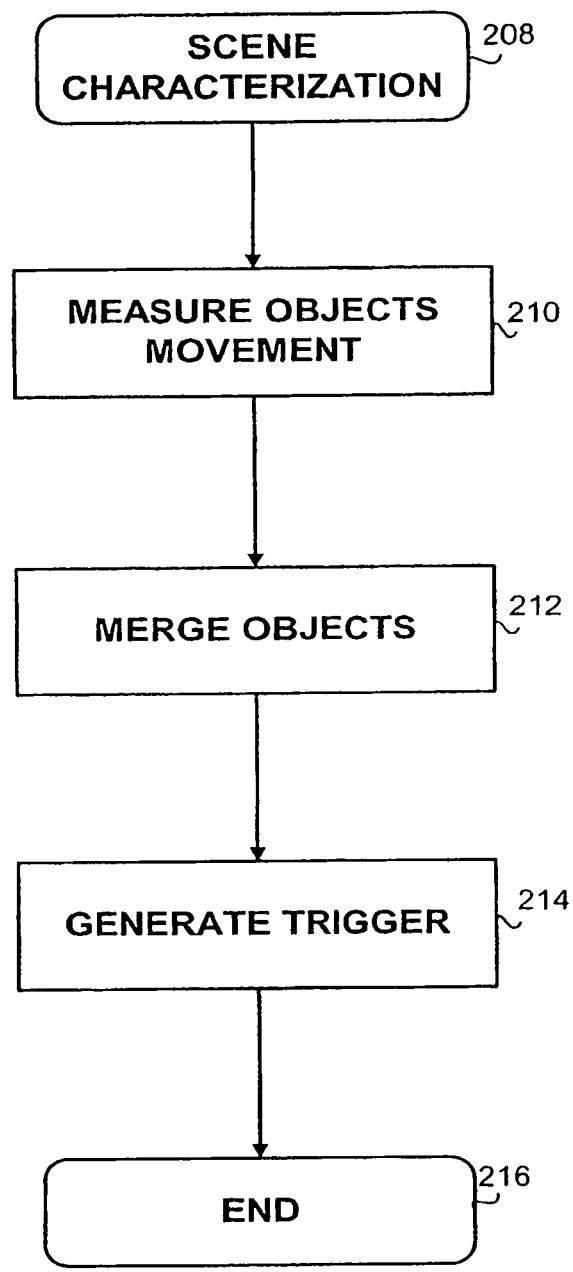
FIG. 11 illustrates the scene characterization, in accordance with the preferred embodiment of the present invention.

Referring now to FIG. 11 the output of the clustering step is the updated spatial parameters of the object stored in the object table. The scene characterization layer 208 uses the existing objects to describe the scene. The layer 208 includes program sections that analyze the changes in the spatial parameters of the object, characterize the spatio-temporal behavior pattern of the object, and update the properties of the object. The temporal parameters and the properties of the object are suitably stored in the objects table. At step 210 object movement is measured. The measurement of the object is performed as follows:

$$dV_x = \text{sgn}(MeanX - PrevMeanX) \quad (14)$$

$$dV_y = \text{sgn}(MeanY - PrevMeanY)$$

$$AccMoveX = 0.5 \cdot AccMoveX + 0.5 \cdot dV_x$$

$$AccMoveY = 0.5 \cdot AccMoveY + 0.5 \cdot dV_y$$

$$AccDist = \sqrt{AccMoveX^2 + AccMoveY^2}$$

MeanX/Y is the location of the center of the object in the current frame. PrevMeanX/Y is the location of the center of the object in the previous frame. The value of non-moving counter is updated in accordance with AccDist as follows:

$$NonMoveCnt = \begin{cases} 0.95 \cdot NonMoveCnt & AccDist > 0.8 \\ NonMoveCnt + 1 & \text{otherwise} \end{cases} \quad (15)$$

In the unattended luggage application there is a possibility that a standing or sitting person that does not make significant movements will generate an alarm. In order to handle such false alarms, the algorithm checks whether there is motion inside the object ellipse. If in at least 12 of the last 16 frames there was motion in the object, it is considered as a moving object. Consequently, the value of the non-moving counter is divided by 2. At step 212 an object merging mechanism is activated. There are cases in which an element in the monitored scene, such as a person or a car, is represented by 2 objects whose ellipses are partially overlapping due to clustering errors. The object merging mechanism is provided for the handling of the situation. Thus, for example, if at least 2 objects are close enough to each other, ("close" as defined in for the clustering process) and are moving with the same velocity for more than 8 frames then the two objects are considered as representing the same element. Thus, the objects will be merged into a single object and a new ellipse will be created to bound the merged objects. The new ellipse data is saved as the spatial parameters of the older object while the younger object is discarded. Each merge is performed between 2 objects at a time. If there are more than 2 overlapping objects that move together additional merges will be performed. Following the characterization of each object's spatio-temporal behavior pattern and other properties, such as texture (including but not limited to color), shape, velocity, trajectory, and the like, against the pre-defined behavior patterns and properties of "suspicious" objects, at step 214 the objects whose behavior pattern and properties are similar to the "suspicious" behavior and properties will generate an alarm trigger. Note should be taken that the suspicious behavior patterns and suspicious properties could vary among diverse applications.

Figure 12:
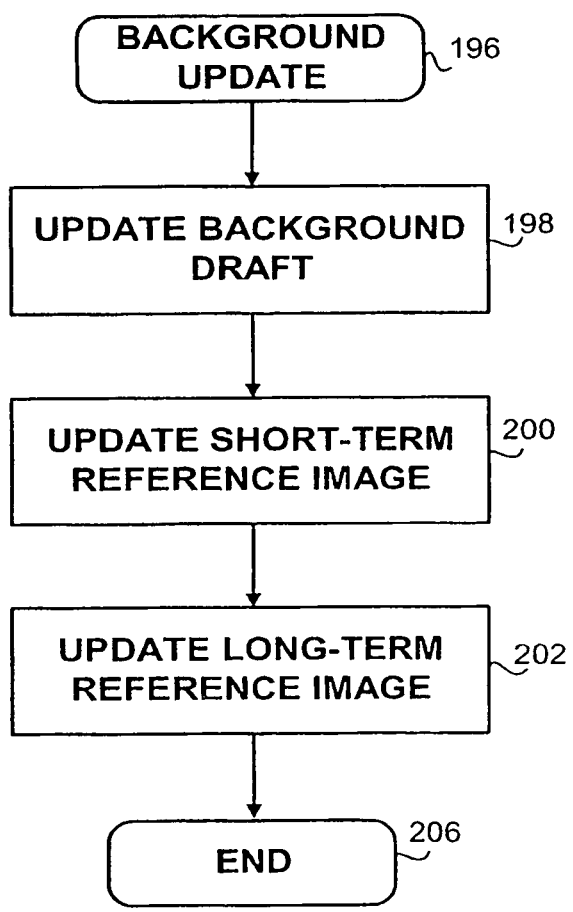
FIG. 12 illustrates the background updating, in accordance with the preferred embodiment of the present invention.

Referring now to FIG. 12 the background update layer updates the reference images for the next frame calculation.

The method uses two reference images: a) the long-term reference image, and b) the short-term reference image. The long-term reference image describes the monitored scene as a background image without any objects. The short-term reference image includes both the background image and static objects. Static objects are defined as objects that do not belong to the background, and are non-moving in the monitored scene for a pre-defined period. In the preferred embodiment of the invention the pre-defined period is defined as having a length of about 1 to 2 minutes. In other embodiments different time unit values could be used. The background updating process uses the outputs of all the previous layers to generate a new short-term reference image. Each pixel that satisfies the following conditions is updated: a) similar enough to the short-term reference image (according to the score given in the pre-processing step), and b) not included in an object. Pixels that do not satisfy the first condition but satisfy the second condition for a long sequence of frames get updated as well. For every fixed number of frames, a comparison is made between the current reference images to the previous reference images, in order to check if the changes made to the reference images were correct. The long-term reference image is updated from the short-term reference image in all pixels that are not contained in any of the tracked objects. An object may change its status from dynamic to static if it is not moving for a given period. It can change its status from static to dynamic if the score thereof in the long-term reference image significantly decreases. The background maintenance could be augmented by user-initiated updates. Thus, the user can add several objects to the background in order to help the system overcome changes in the background due to changes in the location of a background object. For example a "bench" object that was dragged into the scene will be identified by the method as an object. The user can classify the object as a neutral object and therefore can add the object to the background in order to prevent the identification thereof as a dynamic or a static object.

Still referring to FIG. 12 at step 198 the background draft frame is updated. The background draft frame is continuously updated from the current frame in all macro-blocks (16×16 pixels or the like) in which there was mo motion for several frames. Each pixel in the background draft is updated by utilizing the following calculation:

$$\text{Background Draft }(x,y) = \text{Background Draft }(x,y) + \text{sgn}(\text{Current Frame }(x,y) - \text{Background Draft }(x,y)) \quad (16)$$

When an object is identified as a static object, it is assumed that the identified object already appears in the background draft. Thus, the pixels of the object are copied from the background draft to the short-term reference image. The short-term reference image is updated at step 200. The update of each pixel in short-term reference image is performed in accordance with the values of the pixel in the SAD map and in the objects map. In the update calculations the following variables are used:

SAD (x, y)=the SAD map value in the x, y pixel location
OBJECT(x, y)=the number of objects that the pixel in the x, y location belongs to
BACKGROUND_COUNTER (x, y)
NOT_BACKGROUND_COUNTER (x, y)

The previously defined counters are updated by performing the following sequence of instructions:

If (SAD (x, y)<50) and (OBJECT (x, y)=0) then the according to the SAD map the pixel belongs to the background and does not belong to any object. Therefore, the value of the BACKGROUND_COUNTER (x, y) is incremented by one. If SAD (x, y)>50 and (OBJECT (x, y)=0) then the pixel does not belong to the background and does not belong to any object. Therefore, the value of the NOT_BACKGROUND_COUNTER is incremented by one. If OBJECT (x, y) not equal to 0 then there is at least one object that the pixel belongs to. Thus both counters are set to zero. Consequent to the updating of the counters the pixels are updated in accordance with the counters. If BACKGROUND_COUNTER (x, y) greater than or equal to 15 then the pixel at the x, y coordinates is updated and the counter is set to zero. If NOT_BACKGROUND_COUNTER (x, y) greater than or equal to 1000 then the pixel at the x, y coordinates is updated and counter set to zero.

At step 202 the long-term reference image is updated by copying all the pixels that are not bounded by any object's ellipse from the short-term reference image to the long-term reference image.

In the short-term reference image the score of each static object is measured. The score are compared to the score obtained when the object became static. If the current score is significantly lower than the previous score it is assumed that the static object has started moving. The status of the object is set to "dynamic" and the pixels of the object are copied from the long-term reference image to the short-term reference image. Thus, the object will be adjusted for the next frame during the adjustment process.

The applications that could utilize the system and method of object tracking will now be readily apparent to person skilled in the art. Such can include crowd control, people counting, an offline and online investigation tools based on the events stored in the database, assisting in locating lost luggage (lost prevention) and restricting access of persons or vehicles to certain zones, unattended luggage detection, "suspicious" behavior of persons or other objects and the like. The applications are both for city centers, airports, secure locations, hospitals, warehouses, border and other restricted areas or locations and the like.

It will be appreciated by persons skilled in the art that the present invention is not limited to what has been particularly shown and described hereinabove. Rather the scope of the present invention is defined only by the claims, which follow.

The invention claimed is:

1. An apparatus for the analysis of a sequence of captured images covering a scene having a background, for detecting and tracking of moving and static objects and for matching the patterns of object behavior in the captured images to object behavior in predetermined scenarios, the apparatus comprising the elements of:

at least one image sequence source for transmitting a sequence of images to an object tracking program; and
an object tracking program for tracking an object irrespective of the aspect ratio thereof, comprising:
a configuration layer for initializing the apparatus in accordance with user pre-defined parameters, comprising a timing parameters definer component that provides a number of time units to be elapsed before a static object is recognized;
a pre-processing application layer for constructing a long term difference image between a currently captured video frame and a long term reference image, the long term reference image showing the background of the scene, and for constructing a short term difference image between the currently captured video frame and a short term reference image, the short term reference image showing the background of the scene and at least one static object within the scene, wherein the short term reference image is defined by having the least one static object as not belonging to the background of the scene and being stationary, that is, not moving, in the scene for a predetermined period as provided by the timing parameters definer component;

an object clustering application layer for generating at least one new or updated object from the long term difference image and the short term difference image; and a background updating application layer for updating the long term reference image and the short term reference image with background changes prior to processing of a new frame.

2. The apparatus of claim 1 wherein the configuration application layer comprises a reference image constructor, the reference image constructor comprising a current frame capture module for assigning a captured image as the short term reference image or as the long term reference image.

3. The apparatus of claim 1 wherein the configuration application layer comprises a reference image constructor, the reference image constructor comprising a reference image loading module for loading an existing short term reference image or an existing long term reference image located on file as the reference image.

4. The apparatus of claim 1 wherein the configuration application layer comprises a reference image constructor, the reference image constructor comprising a reference image learning module for generating a reference image from a consecutive sequence of captured images.

5. The apparatus of claim 1 wherein the pre-processing application layer comprises:
   a current frame handler for obtaining a captured frame;
   a short term reference image handler for loading an existing short-term reference image;
   a long term reference image handler loads an existing long-term reference image;
   a pre-processor module for generating a new short term and long term reference images;
   a short term reference image handler for updating the short term reference image with the new short term reference image; and
   a long term reference image handler for updating the long term reference image with the new long term reference image.

6. The apparatus of claim 1 wherein the clustering application layer comprises:
   an object merger module for correcting clustering errors by successive merging of at least two partially overlapping objects having the same motion vector for a pre-defined period of time;
   an objects group builder module for creating at east one group of at least two close objects;
   an object group adjuster module for determining the spatial parameters of each object in the at least one group; and
   a new objects constructor module for constructing a new object based on the long term difference image and on the short term difference image.

7. The apparatus of claim 6 wherein the clustering application layer further comprises an object searcher module for locating discarded objects having spatial parameters similar to the parameters of the new object.

8. The apparatus of claim 6, wherein the pixels of a group of overlapping objects are scored based on the respective contribution to the group.

9. The apparatus of claim 1 wherein the objects clustering application layer generates at least one new or updated object from the tong term difference image and the short term difference image and at least one existing object.

10. The apparatus of claim 9 wherein the object tracking program further comprises scene characterization application layer for describing the scene and for triggering an alarm, based on comparing a behavior pattern of the at least one existing object to at least one pre-defined behavior pattern or characteristic.

11. The apparatus of claim 10 wherein the scene characterization application layer comprises an object movement measurement module for analyzing changes in the parameters of the at least one existing object and determining the at least one existing object movement.

12. The apparatus of claim 10 wherein the scene characterization application layer comprises an object merger module for correcting errors the at least one existing object and an alarm triggering mechanism for determining whether an alarm is to be triggered based on the at least one existing object patterns.

13. The apparatus of claim 1 wherein the background updating application layer further comprises a short term reference image updater module and a long term reference image updater module for maintaining the updated short term and long term reference images.

14. The apparatus of claim 1 further comprising an object tracking control database, the database comprising;
   at least one long term reference image, the at least one long term reference image comprising a background image of the scene without dynamic or static objects tracked by the apparatus; and
   at least one short term reference image, the at least one short term reference image comprising a background image of the scene with the dynamic or static objects tracked by the apparatus.

15. The apparatus of claim 14 wherein the object tracking control database further comprising;
   an objects table comprising a list of the dynamic or static objects tracked by the apparatus, each object is associated with object data and object meta data;
   a short-term difference image representing a difference between a currently captured frame and a short-term reference image and a long term difference image representing a difference between a currently captured frame and a long-term reference image; and
   a background draft comprising a changing image of the scene and making up the short term reference image and the long-term reference image.

16. The apparatus of claim 15 wherein the object tracking control database further comprising a discarded objects archive for storing discarded objects.

17. The apparatus of claim 1, further comprising generation of two sophisticated absolute distance (SAD) maps, corresponding to the long term difference image and short term difference image, respectively, wherein each pixel in the SAD maps is provided with a value reflecting the probability of a map belonging either to an object or the background scene.

18. The apparatus of claim 17, wherein for each specific pixel in a currently captured frame the absolute difference between the corresponding pixel in a reference image is calculated taking account of an average value of each corresponding pixel, thereby obtaining probability of a map belonging either to an object or the background scene.

19. The apparatus of claim 17, wherein for each specific pixel in a currently captured frame the absolute difference between the corresponding pixel in a reference image is calculated based on an average of a pixel and pre-determined neighboring pixels, thereby obtaining probability of a map belonging either to an object or the background scene.

20. The apparatus of claim 1, wherein updating the long term reference image and the short term reference image, respectively, is based on pre-determined groups of pixels in respective temporary (draft) images of as current frame in which there was no motion for a plurality of frames, and wherein, consequently, the updating of each pixel in the short-term reference image is performed in accordance with the values of corresponding pixels in a sophisticated absolute distance (SAD) map and an objects map.

21. The apparatus of claim 20, wherein the score is based on the value of a pixel in the group relative to a plurality of pre-determined threshold values.

22. The apparatus of claim 20, wherein an object in the group is discarded based the scores of pixels thereof, area and overlap ratio with other objects in the group.

23. The apparatus of claim 1, wherein a new object is identified based on adjustable concentric virtual rays that reach a pixel having a pre-determined value of a non-recorded object.

24. The apparatus of claim 1, wherein an object is regarded as a static object based on a counter associated with the object relative to a threshold.

25. The apparatus of claim 1, wherein a false alarm is determined in case an object is moving in a bounding structure for a pre-set number of frames out of another pre-set number of frames.

26. A method for the analysis of a sequence of captured images covering a scene having a background, for detecting and tracking of moving and static objects and for matching the patterns of object behavior in the captured images to object behavior in predetermined scenarios, the method comprising:

transmitting a sequence of images to an object tracking program; and tracking an object irrespective of the aspect ratio thereof, by an object tracking program that comprises:

a configuration layer for initializing the object tracking program in accordance with user pre-defined parameters, comprising a timing parameters definer component that provides a number of time units to be elapsed before a static object is recognized;

a pre-processing application layer for constructing a long term difference image between a currently captured video frame and a long term reference image, the long term reference image showing the background of the scene, and for constructing a short term difference image between the currently captured video frame and a short term reference image, the short term reference image showing the background of the scene and at least one static object within the scene, wherein the short term reference image is defined by having the least one static object as not belonging to the background of the scene and being stationary, that is, not moving, in the scene for a pre-determined period as provided by the timing parameters definer component;

an object clustering application layer for generating at least one new or updated object from the long term difference image and the short term difference image; and a background updating application layer for updating the long term reference image and the short term reference image with background changes prior to processing of a new frame.

\* \* \* \* \*